US008825583B2

(12) United States Patent
Sanchez Loureda et al.

(10) Patent No.: US 8,825,583 B2
(45) Date of Patent: Sep. 2, 2014

(54) UTILITY DATA PROCESSING SYSTEM

(75) Inventors: Jose Manuel Sanchez Loureda, London (GB); Adam Richard Westbrooke, Kent (GB)

(73) Assignee: Onzo Limited, London (GB)

( * ) Notice: Subject to any disclaimer, the term of this patent is extended or adjusted under 35 U.S.C. 154(b) by 192 days.

(21) Appl. No.: 13/061,050

(22) PCT Filed: Dec. 20, 2010

(86) PCT No.: PCT/GB2010/052157
§ 371 (c)(1),
(2), (4) Date: Sep. 6, 2011

(87) PCT Pub. No.: WO2011/073691
PCT Pub. Date: Jun. 23, 2011

(65) Prior Publication Data
US 2011/0313964 A1  Dec. 22, 2011

(30) Foreign Application Priority Data
Dec. 18, 2009 (GB) .................................. 0922164.9

(51) Int. Cl.
G06F 17/00 (2006.01)
G06N 5/02 (2006.01)

(52) U.S. Cl.
USPC .......................................................... 706/50

(58) Field of Classification Search
None
See application file for complete search history.

(56) References Cited

U.S. PATENT DOCUMENTS

| 4,335,447 A | 6/1982 | Jerrim et al. |
| 4,858,141 A | 8/1989 | Hart et al. |
| 5,483,153 A | 1/1996 | Leeb et al. |
| 5,600,576 A | 2/1997 | Broadwater et al. |
| 6,195,018 B1 | 2/2001 | Ragle et al. |
| 6,470,283 B1 | 10/2002 | Edel |
| 6,507,794 B1 | 1/2003 | Hubbard et al. |
| 6,826,513 B1 | 11/2004 | Kumar et al. |
| 6,885,309 B1 | 4/2005 | Van Heteren |
| 7,146,288 B1 | 12/2006 | Welch |
| 7,260,272 B2 | 8/2007 | Lin et al. |
| 7,353,245 B2 | 4/2008 | Healey et al. |
| 7,467,170 B1 | 12/2008 | Chen et al. |
| 7,502,698 B2 | 3/2009 | Uenou et al. |

(Continued)

FOREIGN PATENT DOCUMENTS

| CN | 201210176 | 3/2009 |
| DE | 19535719 | 3/1997 |

(Continued)

OTHER PUBLICATIONS

Nelson et al. "Residential Baseload Energy Use: Concept and Potential for AMI Customers", ACEEE, 2008, pp. 233-245.*

(Continued)

*Primary Examiner* — Li-Wu Chang
(74) *Attorney, Agent, or Firm* — Arent Fox LLP

(57) ABSTRACT

A utility data processing system for processing data relating to consumption of a utility comprises: a fact memory for storage of facts relating to utility consumption received from fact sources, at least one fact source module for deriving facts from utility consumption data and adding the derived facts to the tact memory, an inference module for inferring new facts relating to utility consumption from one or more facts stored in the fact memory, and an interlace module.

16 Claims, 9 Drawing Sheets

(56) References Cited

U.S. PATENT DOCUMENTS

| | | |
|---|---|---|
| 7,511,609 B2 | 3/2009 | Hammerschmidt |
| 7,639,129 B2 | 12/2009 | Bickel et al. |
| 7,693,670 B2 | 4/2010 | Durling et al. |
| 8,103,465 B2 | 1/2012 | Brzezowski et al. |
| 8,156,055 B2 * | 4/2012 | Shimada et al. ............ 706/12 |
| 8,201,105 B2 | 6/2012 | Tabe |
| 8,214,270 B2 | 7/2012 | Schaefer et al. |
| 8,271,147 B2 | 9/2012 | Beal et al. |
| 2001/0011278 A1 | 8/2001 | Shimokawa et al. |
| 2003/0158826 A1 | 8/2003 | Burke et al. |
| 2004/0008904 A1 | 1/2004 | Lin et al. |
| 2004/0044713 A1 | 3/2004 | Healey et al. |
| 2004/0153170 A1 | 8/2004 | Santacatterina et al. |
| 2005/0190074 A1 | 9/2005 | Cumeralto et al. |
| 2006/0031180 A1 | 2/2006 | Tamarkin et al. |
| 2007/0013499 A1 | 1/2007 | Hammerschmidt |
| 2007/0241739 A1 | 10/2007 | Uenou et al. |
| 2008/0079741 A1 | 4/2008 | Martin et al. |
| 2008/0178019 A1 * | 7/2008 | McGrane et al. ............ 713/320 |
| 2009/0045804 A1 | 2/2009 | Durling et al. |
| 2009/0066528 A1 | 3/2009 | Bickel et al. |
| 2009/0088991 A1 | 4/2009 | Brzezowski et al. |
| 2009/0287804 A1 | 11/2009 | Banks et al. |
| 2009/0307178 A1 | 12/2009 | Kuhns et al. |
| 2010/0174643 A1 | 7/2010 | Schaefer et al. |
| 2010/0217450 A1 | 8/2010 | Beal et al. |
| 2010/0217452 A1 | 8/2010 | McCord et al. |
| 2011/0004421 A1 | 1/2011 | Rosewell et al. |
| 2011/0213556 A1 | 9/2011 | Yu et al. |
| 2012/0197594 A1 | 8/2012 | Orth et al. |

FOREIGN PATENT DOCUMENTS

| | | |
|---|---|---|
| EP | 0295864 | 9/1990 |
| EP | 1309062 | 3/2004 |
| EP | 0863596 | 3/2008 |
| EP | 2026299 | 2/2009 |
| EP | 2237212 | 10/2010 |
| EP | 2290328 | 3/2011 |
| EP | 2141464 | 9/2011 |
| GB | 1012499 | 12/1965 |
| GB | 1107993 | 3/1968 |
| GB | 2300721 | 11/1996 |
| GB | 2420863 | 6/2006 |
| GB | 2409048 | 7/2007 |
| GB | 2461915 A | 1/2010 |
| GB | 2471536 A | 1/2011 |
| GB | 2473596 | 3/2011 |
| GB | 2490882 | 11/2012 |
| GB | 2472251 | 2/2013 |
| GB | 1108357.3 | 9/2013 |
| JP | P2008-202818 A | 9/2008 |
| JP | 4976158 | 7/2012 |
| WO | 03026346 | 3/2003 |
| WO | 2008142425 | 11/2008 |
| WO | 2008142431 | 11/2008 |
| WO | 2009014995 | 1/2009 |
| WO | 2009016580 | 5/2009 |
| WO | WO 2009/081407 A2 | 7/2009 |
| WO | 2009103998 | 8/2009 |
| WO | WO 2010/007369 A2 | 1/2010 |
| WO | WO 2010/129414 A1 | 11/2010 |
| WO | 2010106253 | 12/2010 |
| WO | 2011002735 | 1/2011 |
| WO | 2011058328 | 1/2011 |
| WO | 2011000356 | 1/2012 |
| WO | 2012156758 | 11/2012 |

OTHER PUBLICATIONS

Kim et al. "ViridiScope: Design and Implementation of a Fine Grained Power Monitoring System for Homes", UbiComp 2009, pp. 245-254.*

Intellectual Property Office, Search Report under Section 17 for British patent application No. GB0922164.9, dated Apr. 21, 2011.

European Search Report & Search Opinion for EP12183390.9 mailed Jan. 25, 2013.

Ideal spatial adaptation by wavelet shrinkage, Biometrika, (1994), 81, 3 pp. 424-455, David Donoho and Ian Johnstone.

* cited by examiner

UTILITY DATA PROCESSING SYSTEM

FIELD OF THE INVENTION

This invention relates to methods, systems, devices and computer code for processing of utility consumption data and managing consumption of utilities, in particular consumption of gas, water and electricity, and using measured utility consumption data to generate facts relating to utility consumption.

BACKGROUND

There is an ongoing and urgent need to reduce consumption of electricity, gas and water both for environmental and cost reasons.

A large proportion of the electrical energy, gas and water supplied by utilities suppliers is wasted as a result of inefficiencies such as use of electrical appliances that have poor efficiency or for behavioural reasons such as appliances that are left switched on and so consume electricity even when not in use, or consumption of water than is actually needed. This leads to wastage and increased utilities costs. Moreover, with respect to electricity, electrical energy use in buildings accounts for a very large proportion of all carbon emissions. Demand for utilities can vary dramatically between identical buildings with the same number of occupants, and this suggests that reducing waste through behavioural efficiency is essential. Therefore, efforts are required to change the patterns of utilities use by consumers.

The utilities suppliers recognise three major obstacles to progress in this objective: a shortage of sources of competitive advantage, a lack of detailed understanding of their customers, and a lack of "touch points", i.e. ways of interacting with the customers. Opportunities for differentiation revolve mainly around price and "green" issues, i.e. reduction of environmental impact. The utilities suppliers have very little information about their customers' behaviour since electricity, gas and water meters collect whole house data continuously and are read infrequently.

Meters to measure total consumption of utilities of a household are commonplace for each of gas, electricity and water, however this total is not useful in identifying areas in which efficiencies may be possible (for brevity, we refer herein to a "household", however it will be appreciated that the present invention is not limited to a domestic house but may be applied to any domestic, workplace or other setting that receives its own discrete utilities supplies, in particular mains electricity supply from an electricity grid; water supply; and/or gas supply.).

Detailed information on utility consumption may be provided by a system comprising a measuring device which may be a standard utility meter, a Smart meter, or an sensor additional to the meter or a datalogger attached to the meter (for example to read pulse output counts).

These systems contain a pathway for returning data to a utility supplier or a utility service provider, such as a return path as in advanced metering infrastructure (AMI) or automatic meter reading (AMR) systems. Alternatively, upload of data may be via the internet through a gateway within the household, and/or via a display or device that logs data and can upload data from time to time by wired or wireless communication means.

Data return may be under the utility provider's control and/or under the consumer's control.

For example, a smart energy kit is available from Onzo Limited in which electricity consumption data measured by an electricity sensor connectable to a conventional electricity meter is wirelessly transmitted to a user display that displays data such as current power consumption, daily total energy consumption, comparison to previous weeks, target energy consumption, cost of electricity consumed and alerts when usage is high and/or at times when national grid demand is high. This data may be uploaded via the internet to a server for analysis of utility consumption.

While metering of this type provide a simple and effective way of communicating detailed information on utility consumption, the information that such meters generate is based only on the directly measured electricity consumption data.

In order to develop a more detailed understanding of utility consumption within a household, household occupants may also be requested to answer a questionnaire including questions such as the household location, household size, number of occupants, appliances within the household, etc., although answering such a questionnaire to the level of detail required to provide improved utility consumption data can be very time consuming and inconvenient. Moreover, the answers given to such questions may change over time.

It is therefore an object of the invention to provide a user-friendly means of generating detailed and accurate information on utility consumption.

SUMMARY OF THE INVENTION

The present inventors have developed a utility data processing system that does not necessarily require user input in order to provide a user with detailed information on utility consumption, and/or to enable the system to directly control appliances within a household in order to optimise utility consumption of those appliances.

"Utility" as used herein may be any delivered supply capable of being metered, including electricity, gas and water supply.

For brevity, we refer herein to a "household", however it will be appreciated that the present invention is not limited to a domestic house but may be applied to any domestic, workplace or other setting that receives its own discrete utilities supplies, in particular mains electricity supply from an electricity grid; water supply; and/or gas supply.

Accordingly, in a first aspect the invention provides a utility data processing system for processing data relating to consumption of a utility comprising:

a fact memory for storage of facts relating to utility consumption received from fact sources;

at least one fact source module for deriving facts from utility consumption data and adding the derived facts to the fact memory; and an inference module for inferring new facts relating to utility consumption from one or more facts stored in the fact memory; and an interface module.

Optionally, one of the at least one fact source modules comprises an appliance identification module configured to identify one or more appliances using data relating to utility consumption by the one or more appliances, and to add the identity of the one or more appliances as one or more facts in the fact memory.

Optionally, the appliance identification module comprises:

a profile generator for generating a utility consumption profile from utility consumption data, the utility consumption data comprising a plurality of utility consumption values measured at a corresponding plurality of measurement points; and an event identifier for identifying an event within the utility consumption profile that matches the profile of a known event associated with operation of a known device, said known event stored in a database of utility consumption profiles.

Optionally, the appliance identification module is further configured to add the time of use and/or duration of use the one or more appliances present within the household as one or more facts in the fact memory.

Optionally, the at least one fact source module comprises a statistics module configured to generate statistical facts on energy consumption from the utility consumption data.

Optionally, the statistical facts are selected from: energy use per period of time; variations in energy usage per period of time; and baseload energy.

Optionally, the period of time is one or more of 1 hour, 1 day, 1 week, 1 month and 1 year.

Optionally, the system comprises an appliance identification module and a statistics module.

Optionally, the system further comprises a data memory for storage of utility consumption data received from at least one utility meter.

Optionally, the interface is a presentation interface configured to present facts on a display screen.

Optionally, the system is configured to receive data from the presentation interface.

Optionally, the fact memory is configured to receive facts declared by a user of the system via the interface.

Optionally, the system is configured to prompt the declaration of a fact by a user.

Optionally, the interface is a control interface.

Optionally, the control interface is configured to control utility consumption within a household managed by the utility data processing system based on control parameters determined by one or more facts.

Optionally, the statistics module is configured to generate average utility consumption by a group of households.

Optionally, the inference module is configured to identify appliances for the appliance detection module to search for.

In a second aspect, the invention provides a method of processing utility consumption data comprising the steps of:
receiving utility consumption data;
deriving at least one fact from utility consumption data;
storing the at least one fact in a fact memory; and
inferring at least one new fact from the at least one fact stored in the utility consumption data.

In a third aspect, the invention provides computer program code which when run on a computer causes the computer to perform the method according to the second aspect.

In a fourth aspect, the invention provides a carrier medium carrying computer readable code which when run on a computer causes the computer to perform the method according to the second aspect.

In a fifth aspect, the invention provides computer program product comprising computer readable code according to the fourth aspect.

In a sixth aspect, the invention provides an article of manufacture comprising:
a machine-readable storage medium; and
executable program instructions embodied in the machine readable storage medium that when executed by a programmable system causes the system to perform the function of processing utility consumption data comprising the steps of:
receiving utility consumption data;
deriving at least one fact from utility consumption data;
storing the at least one fact in a fact memory; and
inferring at least one new fact from the at least one fact stored in the utility consumption data.

In a seventh aspect, the invention provides a utility data processing data system for deriving facts relating to consumption of a utility comprising:
a fact memory for storage of facts relating to utility consumption received from one or more fact sources;
wherein one said act source comprises an inference module configured to infer new facts relating to utility consumption from one or more facts stored in the fact memory; and
a question management module configured to communicate a request to a system user to provide one or more facts not available from any other fact source.

In an eighth aspect, the invention provides method of processing utility consumption data comprising the steps of:
analysing facts relating to utility consumption stored in a fact memory to identify one or more required facts not contained within the fact memory; and
if one or more required facts is not contained within the fact memory, communicating a request to a system user to provide the one or more facts.

In a ninth aspect, the invention provides computer program code which when run on a computer causes the computer to perform the method according to the eighth aspect.

In a tenth aspect, the invention provides a carrier medium carrying computer readable code which when run on a computer causes the computer to perform the method according to according to the eighth aspect.

In an eleventh aspect the invention provides a computer program product comprising computer readable code according to the tenth aspect.

In a twelfth aspect the invention provides an article of manufacture comprising:
a machine-readable storage medium; and
executable program instructions embodied in the machine readable storage medium that when executed by a programmable system causes the system to perform the function of processing utility consumption data comprising the steps of:
analysing facts relating to utility consumption stored in a fact memory to identify one or more required facts not contained within the fact memory; and
if one or more required facts is not contained within the fact memory, communicating a request to a system user to provide the one or more facts.

"Facts" as used herein means facts relating to utility consumption within a household and factors affecting utility consumption. Facts include but are not limited to: number of occupants in a household; geographic location of a household; identity of appliances that consume the utility; duration of use of appliances; time of day when utilities are consumed; duration of use of appliances; cost of electricity consumed; and baseload.

"Baseload" as used herein means the minimum level of utility demand during a defined period, which may be a fixed period such as 24 hours or a user-defined period such as waking hours.

BRIEF DESCRIPTION OF THE FIGURES

The invention will now be described in more detail with reference to the Figures, wherein.

DETAILED DESCRIPTION OF HE INVENTION

Figure 1:
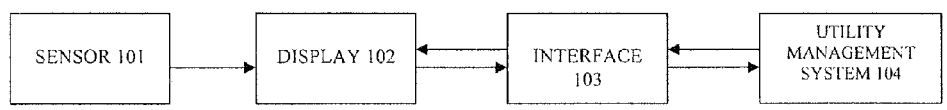
FIG. 1 illustrates a system for communicating utility consumption data to a fact generator.
Figure 2:
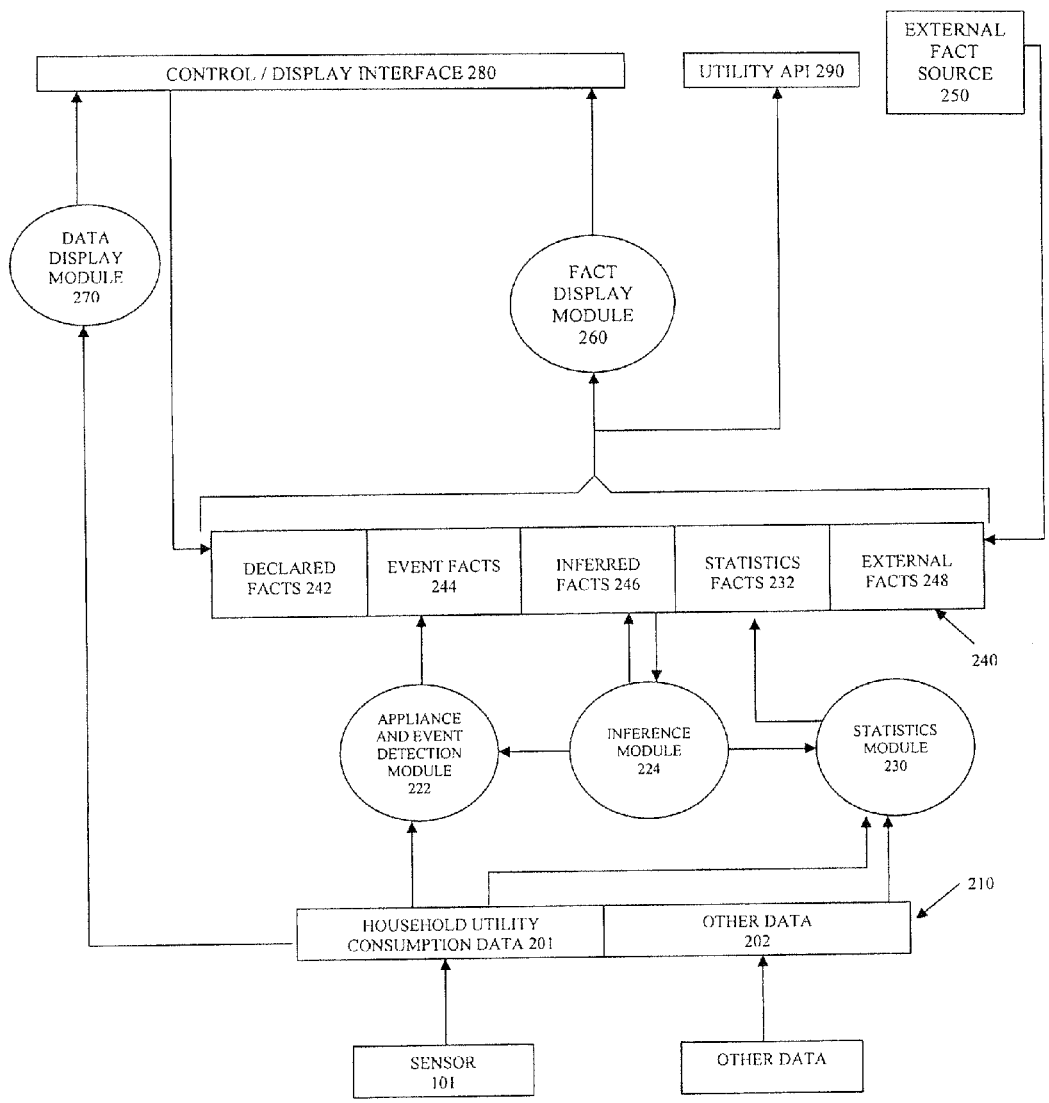
FIG. 2 illustrates a utility management system according to an embodiment of the present invention.
Figure 3:
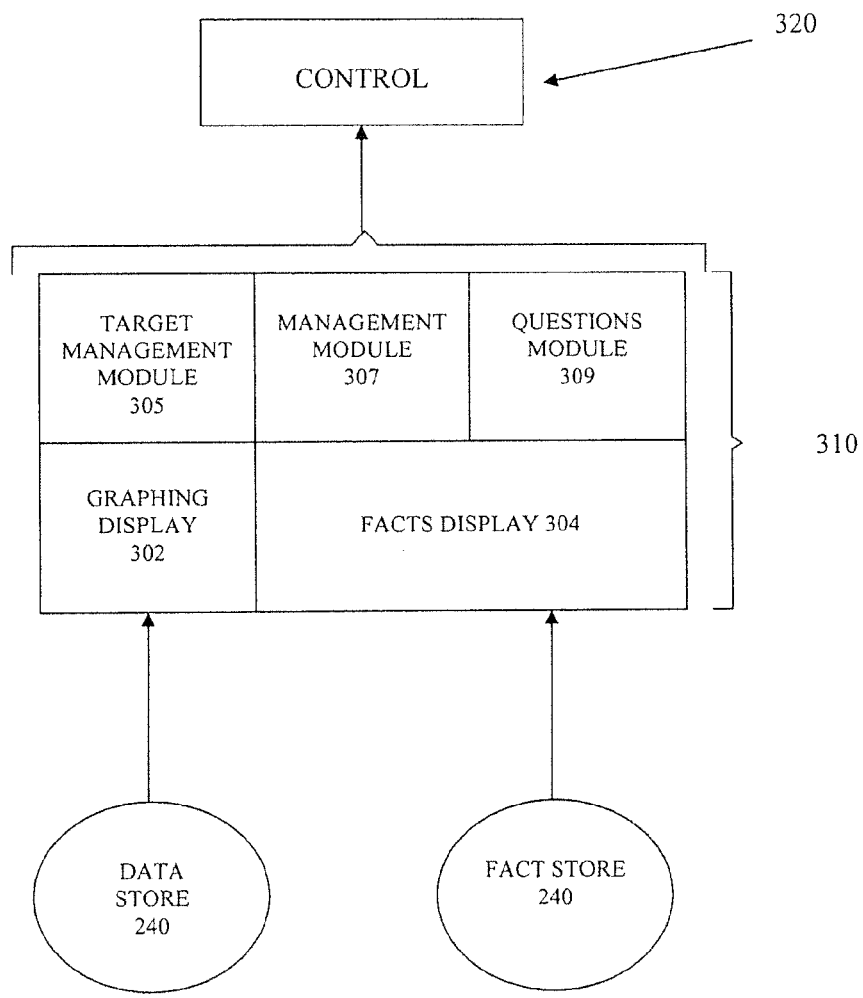
FIG. 3 illustrates a control and display interface according to an embodiment of the present invention.

FIGS. 1-3 describe a utility data processing system for processing of electricity consumption data (although it will be appreciated that analogous systems may be used in relation to management of other utilities, such as water and/or gas consumption).

With reference to FIG. 1, electricity consumption is measured by sensor 101. A sensing device such as a clamp-on energy meter as disclosed in WO 2008/142431 or as available as part of Onzo Limited's smart energy kit, measures real and reactive power at fixed time points ("real power" and "reactive power" as used herein have the meanings as understood by a skilled person in the art in relation to power supplied to a load from an alternating current source). Electricity consumption may be measured at least once every 60 seconds, for example once every second, and the measurements are captured as two separate streams of real and reactive power data. One advantage of measuring both real and reactive power is that, between them, it is possible to measure power demand of most or all appliances. For instance, it may be difficult or impossible to obtain a meaningful measurement of real power for certain appliances such as set-top boxes, however reactive power for these devices can be measured.

Also measured is energy consumed at fixed time intervals, typically every second. From this can be calculated a running total of energy consumed over longer periods, for example every 512 seconds, 2048 seconds or 86,400 seconds (24 hours). These measurements can also be used to show the maximum and minimum energy usages over one of these longer time periods.

The high "granularity" of data obtained from a relatively high frequency of measurement as described may yield a larger number and higher accuracy of derived or inferred facts, however it will be appreciated that derived or inferred facts can likewise be generated from a lower frequency of measurement such as once every hour, once every day or even lower frequency.

The measured data is communicated wirelessly to a user display 102, such as the portable display available in Onzo's smart energy kit. To enable wireless communication, the sensor may be, for example, a ZigBee end device (ZED). The display can show information such as current power consumption, daily total energy consumption, comparison to previous weeks, target energy consumption and current and cumulative cost of electricity consumed. Where the sensor is a ZED it may be a device as disclosed in PCT/GB2010/051707.

The display 102 may communicate by a wired or wireless link with interface 103, such as a user's PC, to upload the measured electricity consumption data via, a utility management website.

In addition to, or as an alternative to, uploading the electricity consumption data through the display 102, the data may be communicated wirelessly directly from the sensor. For example, in the case where the sensor is a ZED, the data transmitted from the ZED may be communicated to a ZigBee Ethernet gateway and from there to a router.

Utility consumption data may be communicated by any other means known to the skilled person, for example by use of automated metering infrastructure (AMI) or automatic meter reading (AMR) systems.

Control of the communication of data may be under the control of one or more of a system user such as a household occupant; a utilities provider; and a utilities service provider, such as a provider of utility data processing services.

Uploaded data is analysed by utility data processing system 104 to generate facts relating to utility consumption, and information generated from these facts may be communicated back to the user on interface 103, downloaded to display 102, or presented to a user on a different interlace. This interface presents information relating to utility consumption that enables a user to make decisions on how to manually manage utility consumption. Additionally, the interlace may enable automated control of utility consumption.

FIG. 2 illustrates the utility data processing system in more detail. In overview, the system takes information from one or more different sources, such as measured household electricity consumption data or facts about the household declared by a user, and uses this data to derive further facts about the household, such as appliances present within the household. In this way, it is possible to build up a detailed profile of energy consumption within the household that can be used to inform a user of energy consumption within the household and/or to control energy consumption.

For example, the present inventors have found that one set of facts that may be derived from the electricity consumption data is the identity of electrical appliances within the household, and with this set of facts the system can identify further facts relating to occupancy and activity within the household based on patterns of usage of those identified appliances. Although the accuracy of inferred facts may be verified by a user of the utility data processing system, such as an occupant of the household, the utility data processing system is operable to generate a highly detailed profile of the household without necessarily requiring any input at all from a user, or requiring only limited user input.

The utility data processing system comprises a data store 210, a facts store 240 containing facts derived from data stored in data store 210, a display interface for presenting facts to a user, and a control interface for automated control of electricity consumption. The display interface and control interface are combined in a control/display interface 280. Facts are generated using inference system 224.

Each of these components is described in more detail below.

Data Store

Household electricity consumption data 201 is stored in data store 210. This electricity consumption data may be from sensor 101 as described above with respect to FIG. 1, or from any other electricity consumption measurement source wherein electricity consumption at a plurality of time points has been measured. Non-household electricity consumption data 202 may also be stored in the data store 210. Non-household electricity consumption data 202 may include data such as National Grid power consumption data by substation.

The household electricity consumption data comprises a plurality of electricity consumption values at a corresponding plurality of measurement points, as measured by and transmitted from the sensor 101 as described above.

Analogously, household gas and/or water consumption data from household gas and/or water meters may also be stored in the data store 210. Water and gas consumption, in particular water consumption, may be measured at a lower rate than electricity consumption, for example at least once every 300 seconds or at least once every 60 seconds, in order to generate water consumption data. The rate of flow of water or gas at each time interval may be measured, along with the total volume consumed over time in a manner analogous to power and energy measurements of electricity consumption. Additionally or alternatively, water and gas consumption may be measured at measurement points after intervals of volume consumption rather than intervals of time, for example a measurement of time elapsed for each unit volume (e.g. liter) of water to be consumed.

If household gas and/or water consumption data is stored then in the data store 210 then non-household gas and/or water consumption data may also be stored in the data store 210.

Inference module 224, statistics module 230 and appliance and event detection module 222 are used to populate fact store 240 with facts, as described in more detail below.

Appliance and Event Detection Module

Appliance and event detection module 222 is configured to analyse the electricity consumption data to identify changes in electricity consumption over time, in particular changes in real and/or reactive power, that are indicative of specific devices. For example, the event of a refrigerator switching on entails an identifiable series of power changes characteristic of that event. In this way, the appliance and event detection module 222 is able to detect and identify "signature" events associated with operation of an appliance. In this way, the identity of appliances present within the household can be derived from electricity consumption data, and fact store 240 can be populated with this information. Moreover, the electricity consumption data stored in data store 210 includes data relating to the time of measurement and so appliance and event detection module 222 is also able to identify the time at which events occur, for example a kettle or television being switched on or off. The identity of appliances in the household may be derived from consumption data using techniques disclosed in PCT/GB2010/002093.

Once an appliance has been identified based on a signature event associated with that appliance, the detection module 222 may analyse future electricity consumption data in search of that event to build up a picture of how that appliance is used over time. Doing this for a single appliance or multiple appliances can be used to build up a detailed pattern of energy usage within a household.

Inference Module

In operation, inference module 224 instructs appliance and event detection module 222 to analyse the electricity consumption data in search of a specific appliance, or event associated with operation of an appliance. Initially (for example if fact store 240 is empty) detection module 222 may be instructed by inference module 224 to search for appliances that are present in most households, for example a refrigerator or a television. If detection module 222 identifies the presence of a given appliance, inference module 224 may then instruct detection module 222 to search for other appliances that are likely to also be present in view of the presence of that given appliance. For example, if a television is identified then inference module 224 may instruct detection module 222 to search for a DVD player and/or a set-top box.

The inference module 224 also generates inferred facts 246 that do not necessarily involve use of the appliance and event detection module. For example, if an existing fact in the fact store 240 is that a DVD player and/or a set-top box is present in the household then it may be inferred that a television is also present in the house without necessarily requiring the appliance and event detection module 222 to search for that appliance.

Statistics Module

The statistics module 230 generates a variety of statistical facts 232 based on the measured electricity consumption data including:

i) Average energy usage. This may be average usage for any given time period such as a day, week or month, or average usage for a given point such as a day of the week.

ii) Times of maxima and/or minima in energy usage.

iii) Average cost of electricity, calculated using energy supplier tariffs in combination with electricity consumption data.

In relation to each of (i), (ii) and (iii) above, the statistical facts generated may be in relation to energy consumption within the household as a whole and/or in relation to one or more specific appliances.

Initially, when fact store 240 is empty, statistics module 230 may be used to initiate its population, for example by adding facts relating to energy usage per time period, identifying facts relating to variation of consumption, such as variation in consumption over the course of a week; and determining baseload energy consumption.

In addition to generating statistical facts from energy consumption data, the statistics module 230 may also use data relating to national average electricity consumption and statistical facts to provide a user with a comparison of household energy consumption with the national average. Alternatively or additionally, comparison may be made with one or more peer groups such as households of a similar size; households of similar occupancy; or households within the same locality, such as households within the same village, town or city. The statistics module can be used to set targets for reduction in energy consumption. The target may be a target energy consumption over a given period of time (such as 1 week or 1 month) that is a defined percentage lower than the measured household energy consumption for a previously measured period of time. Moreover, the target may relate to one or more specific appliances, such as appliances that consume a high percentage or disproportionate amount of the total energy consumed, rather than a target in relation to the household as a whole. Alternatively or additionally, the target may be to match or fall below the national average electricity consumption, or electricity consumption of one or more selected peer groups.

The statistics module 232 may also be used to set tips for energy consumption. This may be, for example, a tip suggesting that energy be used less at a specific time of day when national or regional energy demand is high, if household energy demand at that time is high.

In the embodiment of FIG. 2, statistics module 230 serves to both generate statistical facts 232 using electricity consumption data 201; to generate statistics in which electricity consumption within the household is compared with the national average or a peer group; and to generate targets or tips for energy consumption. However, it will be appreciated that generation of statistical facts 232, generation of statistics and generation of targets and/or tips may each be carried out by separate modules of the system.

Fact Store

The fact store 240 stores the following:

i) Declared facts 242, for example a declaration from a user of the utility data processing system, such as a household occupant, that a certain appliance is present within the household; information on geographic location of the household; information on size of the house such as number of bedrooms and bathrooms; and information on the number of household occupants.

Facts may be declared in response to a prompt by the utility data processing system. For example, a user of the system may be asked to verify if an appliance identified by the appliance and event detection module 222 is indeed present in the household. Alternatively, a user may provide facts unprompted, for example a user may identify the presence of an appliance that has not been detected by the appliance and event detection module 222.

ii) External facts 248, which may be from one or more external fact sources 250, for example information on energy consumption by commercially available appliances and information on the household electricity tariff. External facts 248 may also include facts that are not provided as declared facts 242 but that are available from other sources, such as the address of the household.

iii) Derived facts, which includes:

Event facts 244 derived from appliance and event detection module 222, such as the identity of an appliance within the household that is derived from household electricity consumption data by operation of the appliance and event detection module 222. Event facts also include time, energy consumption and duration of use of appliances (identified either by declaration or derivation).

Statistical facts 232 derived from statistics module 230 as described above, including but not limited to energy use per day, week, month or year; variations in energy usage on different days of the week; variations in energy usage during different hours of the day; baseload energy; and periods when energy usage is a defined percentage above the baseload level for a defined period of time.

iv) Inferred facts 246, that are facts that can be inferred from existing facts in the fact store 240, as described above with respect to operation of inference module 224.

Each one of the aforementioned facts may be a "final fact", an "intermediate fact" or both.

A final fact is a fact that is presented to a system user and/or used in determining a control parameter in the case of automated utility consumption control. For example, the fact that a refrigerator is determined to be present in the household may be a final fact.

An intermediate fact is a fact that is used to generate further facts, such as a fact that causes inference module 224 to seek further facts based on the intermediate fact. For example, the fact that a television is determined to be present in the household may be an intermediate fact that causes the inference module 224 to infer the presence of a television as a further fact and or to direct appliance and event detection module 222 to analyse utility consumption data in order to determine if a related appliance such as a television is present in the household. It will be appreciated that an intermediate fact may also be a final fact.

Similarly, an intermediate fact may cause the system to present a question to a system user wherein the answer to the question is stored as a declared fact.

Confidence

It will be appreciated that a declared, event or inferred fact may be incorrect. For example, it will be appreciated that declared facts may be incorrect. In the case of event facts, the appliance and event detection module 222 may identify an appliance which is in fact not present within the household. A confidence or probability may be associated with each fact, and if that confidence does not exceed a threshold (for example, at least 50%) then the associated fact may be disregarded for use as an intermediate or final fact.

An inferred fact generated from two or more existing facts may have a confidence based on confidence of the starting acts. For example, combination of two facts both having a confidence of 50% may give an inferred fact with a confidence of 25%. Alternatively, a combination of facts may produce an inferred fact having a confidence based on other factors. For example, if it is known that 60% of nationwide or peer-group households with a TV and DVD player also possess a digital set-top box then determining that a TV and DVD player are present within a household may give a confidence that a digital set-top box is present of no more than 60%.

In the event of a discrepancy between two facts, the fact with the highest confidence may be taken to be the accurate fact.

The confidence associated with any given fact may be increased or decreased by use of other facts. For instance, in the example given above of a digital set-top box, the confidence of the inferred fact may be increased by using the event identification process to seek a signature corresponding to a set-top box.

Additionally, sensors within a household may provide further data that can be used to adjust confidence for any given fact, including but not limited to the following:

Water consumption for appliances such as washing machines. For example, the confidence of a fact that a washing machine is present in a household may be increased not only by identifying an electrical event series associated with operation of a washing machine but also by determining if water was consumed at the same time as electricity was consumed for the relevant event series. In a more sophisticated analysis, measurement of a household's water demand over time may be used to identify water consumption signatures of appliances present in the household that can be matched to known water consumption signatures of known appliances. For instance, a water consumption signature may be based on changes in rate of water consumption with time in a manner analogous to electrical appliance signatures.

Gas consumption for appliances that consume both gas and electricity in the same way as water consumption described above.

Temperature of appliances that change temperature with use, for example refrigerators, freezers and boilers.

Temperature difference between household ambient temperature and external temperature.

Movement sensors such as passive infrared sensors to determine times at which a household is occupied for correlation with other facts relating to appliances in the household and their time of use.

Probability data in particular data derived from:

(i) Socio-economic data, seasonal data and/or geographic data. For example the confidence in an inferred, derived or event fact may vary based on the nature of the household (e.g. domestic or office), the geographic location of the household and the household peer group. With respect to location of the household, factors affecting the confidence of a fact, such as facts relating to presence of a given appliance being present in a given household, may include demographics of household residents in the area in which the household is located. Similarly, the climate in the location of the household may have an effect on confidence associated with a fact. For instance, confidence associated with facts relating to presence and use of heating appliances may be higher in relatively cold climates whereas confidence associated with facts relating to presence and use of cooling appliances may be higher in relatively warm climates.

(ii) Behavioural data. For example, the confidence of an event fact associated with operation of a lawnmower may be increased if the relevant event series occurred during the day, however confidence may be decreased if the relevant event series occurred at night. The use of certain appliances may also vary over the course of a year and from season to season, and this variation may also be taken into account in determining a confidence. For example, the confidence that a heating appliance is present and in use in the household may be higher in the winter than in the summer, and vice versa for a cooling appliance. The variation in frequency and intensity of use of such appliances over the course of a year may be taken into account.

Fact and Data Display

Utility consumption data from the data store 210 and facts from the fact store 240 are presented to a user at interface 280. The interface may be any form of interlace, such as a web interface or other interface capable of receiving and displaying data from the utility data processing system. For example, the interface may be a touch-screen display located within the household that is configured to receive and display data from fact display module 260 and data display module 270.

Interface 280 is capable of sending information back to the system, such as declared facts 242 that may be unprompted inputs made by a user or may be in responses to questions generated by the system. In the case of automated utility management, information sent back to the system may be control instructions such as control parameters to be applied by the system.

Fact display module 260 and data display module 270 are described in FIG. 3.

The fact display module 260 is configured to present facts at interface 280 using facts display 304 relating to appliances consuming electricity during a chosen period of time such as:
  identity of appliances consuming electricity during the period; and
  for each identified appliance, the energy consumed, duration of use, time of use and cost of electricity incurred during the period.

The facts display module 260 may also provide indications of changes that have been detected. For example, if an appliance is showing an abnormal event series, such as higher than usual energy consumption, then a user may be alerted to a possible fault in that appliance.

Likewise, the data display module 270 is configured to present utility consumption data such as total energy consumed in a given period, for example in kilowatt hours; times of maximum and minimum energy usage during that period; and total cost of electricity consumed during that period.

Statistics may also be presented using statistics 232 such as:
  usage that is significantly higher or lower than the national or peer average; and
  usage that is significantly higher or lower than the historical household average.

This may be presented in numerical format or in the form of a display using graphing display module 302. These usage statistics may be for any given period, for example for any selected day, week, month or year. Alternatively, these statistics could be presented as text, such as "your electricity consumption during [selected day or month or week or year] is [much lower/lower/higher/much higher] than [the national average/peer group average/household average]". Comparisons may be made based on calendar periods as an alternative to or in addition to an overall average. For example, consumption for the month of January may be compared to overall consumption and/or consumption for the previous January or Januaries to take account of seasonal variations in utility consumption. Likewise, comparisons may be made between weekends and weekdays rather than entire weeks, or for specific days, to take account of different utility consumption patterns across these different periods.

The presentation of data may be used for purposes other than management of utility consumption.

For example, a pattern of utility consumption may be determined by monitoring utility consumption over time. This pattern may be stored as indicative of normal utility consumption within the household for a defined period, such as 24 hours (such as a pattern indicative of normal utility consumption on weekdays and a pattern indicative of normal utility consumption on weekends). A user may be alerted if energy usage varies from this pattern.

For example, a security service may be provided wherein the pattern includes a period during weekdays when utility consumption is low, indicative of an empty household. A system user may be alerted to variations to this pattern, such as utility consumption at any point in time during this empty period that exceeds normal levels by a predetermined multiple of the normal level at that point in time.

Similarly, a service may be provided to vulnerable individuals such as the elderly and/or individuals that live alone wherein the detection of a change in a normal pattern of consumption of utilities triggers an alert to check on the wellbeing of those individuals. The change may be the occurrence or absence of a specific detectable event, such as a failure to detect use of a specific appliance within a specific time period, or a failure to detect use of any appliances at all for a specified length of time and/or within a specified time period.

Question Management Module

The utility data processing system is configured so as to enable processing of utility consumption data by generating accurate facts with a minimum of user input. User input may be completely unnecessary, however the utility data processing system may prompt direct user input to increase the number of facts and/or to improve confidence in accuracy of facts. Exemplary questions that may be made to a system user include but are not limited to the following:
  How many adults live in your home?
  What type of air conditioning is there in your home?
  How many rooms are bathrooms?
  How many rooms are bedrooms?
  Do you have cavity wall insulation?
  How many people under 18 live in your home?
  Are any people at home during the day?
  How many of your windows are double glazed?
  How many storeys do you have?
  Do you have floor insulation?
  Do you have a food processor?
  Do you have an electric fryer?
  Do you have a games console?
  Do you have a garden pond?

Figure 4:
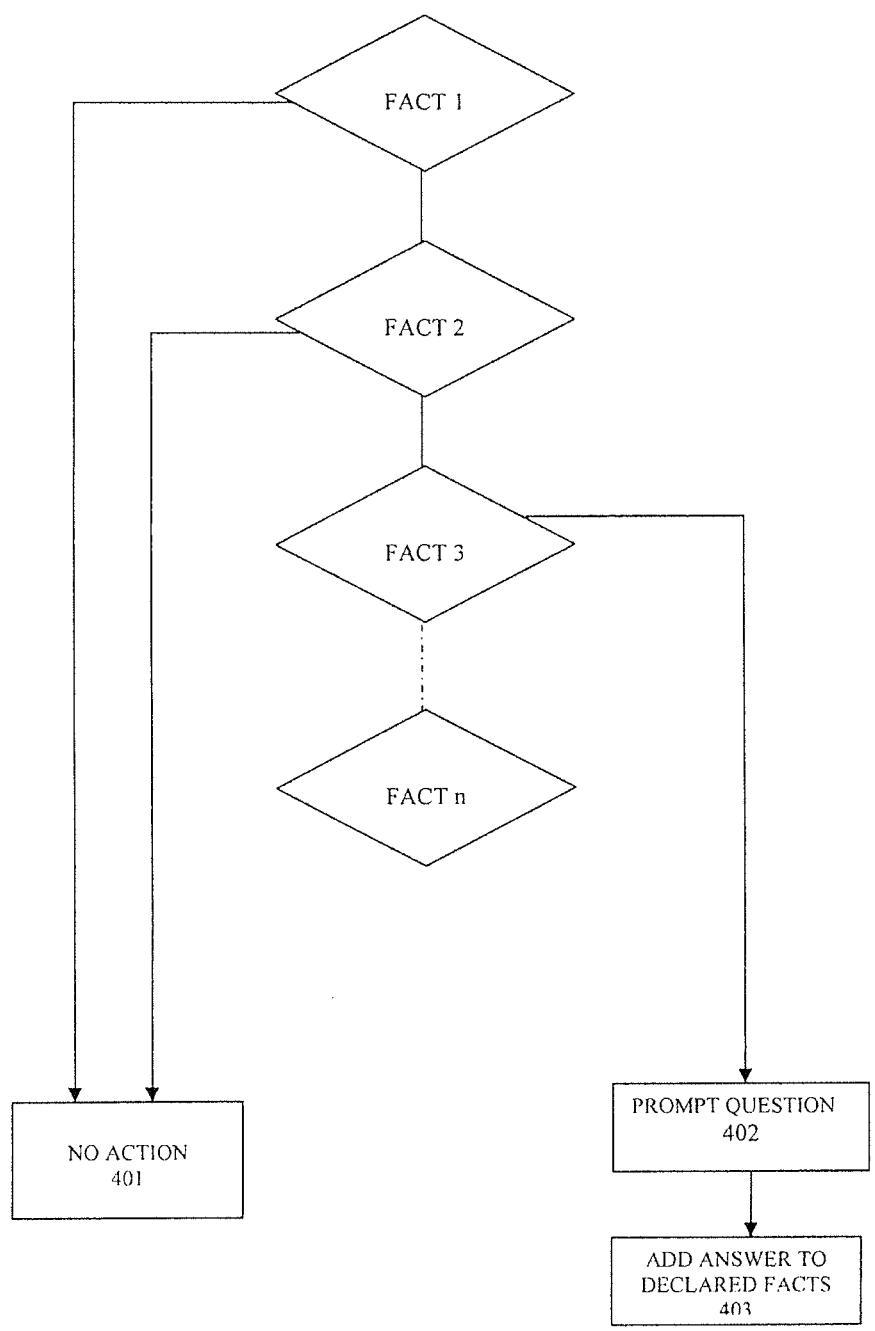
FIG. 4 is a flow chart illustrating operation of a question management module of the system according to an embodiment of the present invention.

FIG. 4 illustrates a flow chart in which facts (Fact 1, Fact 2, Fact 3 . . . Fact n) are checked to determine if those facts are present in the fact store. If a fact is found in the fact store 240, as illustrated in FIG. 4 as "Y" for Facts 1 and 2, then no further action is taken. If, however, one or more facts has not been obtained from any other fact source available to the system, illustrated by "N" for Fact 3, then questions management module 309 prompts a user with a question to provide that fact or facts to be stored in fact store 240 as a declared fact.

The prompt may be displayed on a display that is located within the household for an occupant of the household to respond to, such as display 102, and/or it may be transmitted from the utility data processing system in the form of an email, text message, secure web page or other communication means to a registered user of the system.

The questions module 309 may be operated not only when the utility data processing system is first used but also on an ongoing basis to identify changes that need to be reflected in the contents of the fact store 240. For example, if energy consumption has fallen significantly then this may prompt the questions management module to ask a user if household occupancy has changed, which may affect the household peer group. Similarly, if the event and appliance detection module 222 identifies the absence of an event within the household that had previously been regularly recurring, or the presence of a different event in its place, then question management module may ask a user if the relevant household appliance has been removed or changed. A significant increase or decrease in household energy consumption for a given period (for example, an increase or decrease that is a preselected percentage above or below the household average for the period in question), or other disruption to an established pattern of utility consumption, may also prompt the system to enquire if there have been any changes in the household causing this change in utility consumption.

Target Management Module

Target management module 307 provides the user with detailed information on actual vs. target consumption, which may be generated using statistics as described above, and may generate a list of tips or "to do" items that will serve to reduce household energy consumption, particularly in areas in which energy consumption is relatively high compared to national, peer group or historic household averages, such as the following:

Its easy to forget when you switched the oven on to pre-heat. But it could be costing you a fortune. So watch your time!

Boiling excess water wastes money. Measure the amount you need with a cup mug or teapot before switching the kettle on Loading dishes in their proper places will maximise cleaning efficiency Use a brush rather than a vacuum to clean floors Did you know that up to 35% of heat can be lost through your walls? Insulation can make a huge difference to your heating bill "Draught-proofing windows, doors and floorboards is cheap and effective"

Fix bubble wrap to the back of the loft door and it will stop heat escaping into the loft "Washing clothes at 30° C. instead of a higher temperature can use significantly less electricity!"

Modern powders and detergents work just as effectively at lower temperatures

Washing with a full load is much more efficient than washing several smaller loads "Look out for cycles such as 'quick wash' for clothes that aren't very dirty and just need a freshen up, or '½ load' if the drum's not full"

"Washing less frequently save detergent, water and electricity and your clothes will last longer!"

Keep an eye out for the energy label and try to buy the most energy efficient model you can Switching appliances off at the wall saves you energy and money Fluff in the filters makes your tumble dryer use more energy. Clean them now and then to save money "Overfilling your dryer stops the air circulating properly and your clothes will take longer to dry, using more energy"

Utility consumption facts may also be passed to utility suppliers or other third parties via API 290 subject, as necessary, to control of confidential information.

Control

The utility data processing system of the invention may, in addition to or as an alternative to displaying facts about utility consumption, use the facts to control appliances via interface 280. In particular, one or more appliances may be automatically switched on or off or otherwise adjusted if one or more pre-determined parameters are met such as user pre-approval for such control.

For example, the utility data processing system may be configured to minimise utility consumption at a time when the system determines that the household is unoccupied; to reduce consumption by appliances that are identified as non-essential; or in order to meet a utility consumption target.

Implementation of automated control may be using building management systems (BMS) known to the skilled person.

Event Identification Process

Operation of the event detection module 222 referred to above is described here in more detail.

Measurement

A sensing device such as a clamp-on energy meter as disclosed in WO 2008/142431 measures real and reactive power at fixed time points. A higher frequency of measurement will obviously yield more electricity consumption data, which in turn increases the likelihood of an accurate match when the profile generated from the measured data is compared to stored electricity consumption profiles. Typically, electricity consumption is measured at least once every second. This is captured as two separate streams of data ("real power" and "reactive power" as used herein have the meanings as understood by a skilled person in the art in relation to power supplied to a load from an alternating current source). One advantage of measuring both real and reactive power is that, between them, it is possible to measure power demand of most or all appliances. For instance, it may be difficult or impossible to obtain a meaningful measurement of real power for certain appliances such as set-top boxes, however reactive power for these devices can be measured.

Also measured is energy consumed at fixed time intervals, typically every second. From this can be calculated a running total of energy consumed over longer periods, for example every 512 seconds, 2048 seconds or 86,400 seconds (24 hours). These measurements can also be used to show the maximum and minimum energy usages over one of these longer time periods. Although these energy consumption measurements are not used in generating an "event matrix" as described in more detail below, this information is nevertheless beneficial in providing a detailed picture of energy consumption over the course of an extended time period during which various appliances may be switched on and off.

Consumption of water and gas can be measured using techniques that are well known to the skilled person, for example based on use of water and gas meters. Water and gas consumption, in particular water consumption, may be measured at a lower rate, for example at least once every 300 seconds or at least once every 60 seconds, in order to generate water consumption data that may be used to identify events associated with consumption of water. The rate of flow of water or gas at each time interval may be measured, along with the total volume consumed over time in a manner analogous to power and energy measurements of electricity consumption. Additionally or alternatively, water and gas consumption may be measured at measurement points after intervals of volume consumption rather than intervals of time, for example a measurement of time elapsed for each unit volume liter) of water to be consumed.

Compression

Figure 5:
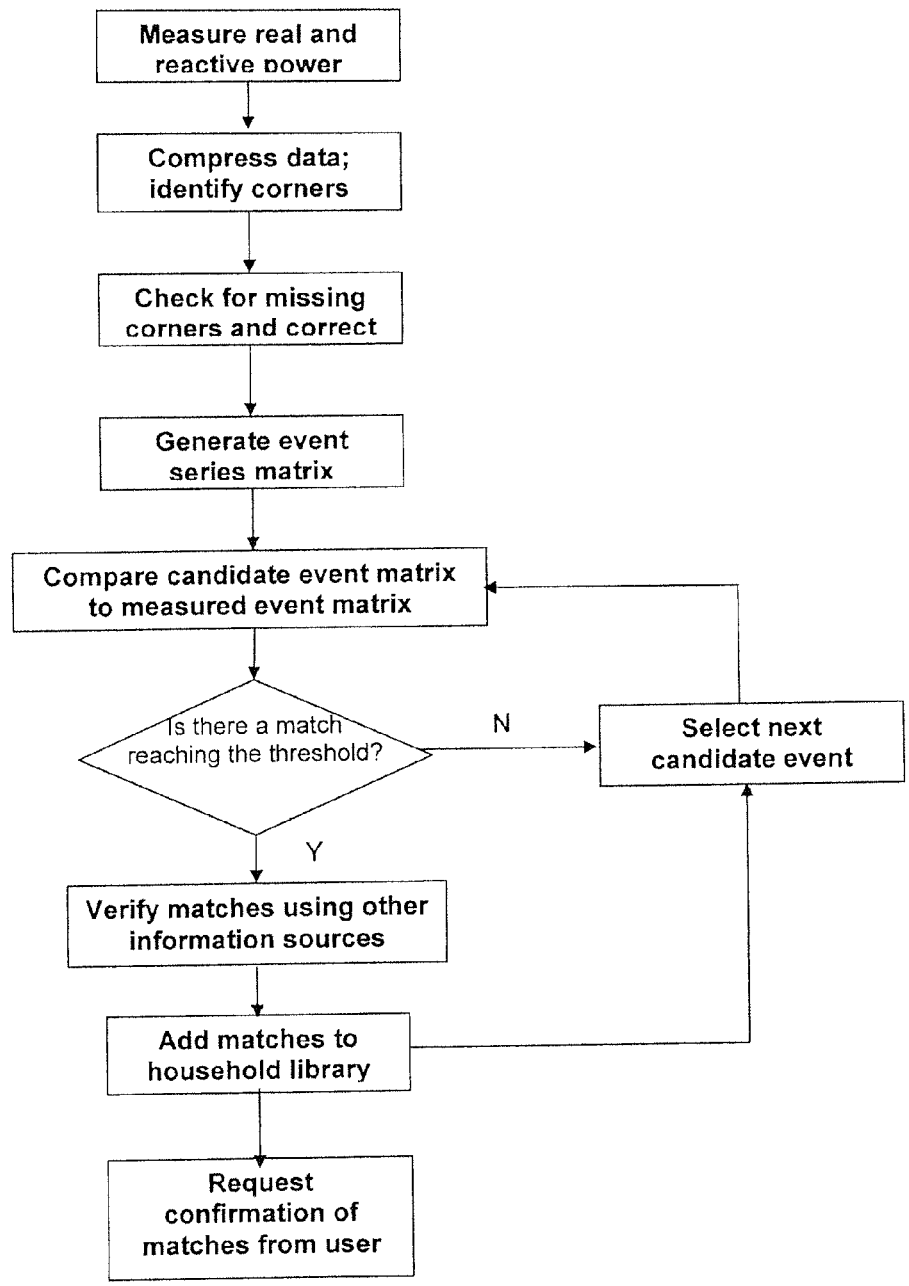
FIG. 5 is a flowchart illustrating measuring, analysis and matching steps in an event identification process.

As shown in FIG. 5, the electricity consumption data relating to real and reactive power is fed into a compression algorithm, referred to hereinafter as a "corner detection algorithm". The compression and corner detection may be carried out as disclosed in PCT/GB2010/002092 and/or PCT/GB2010/002093.

Figure 6:
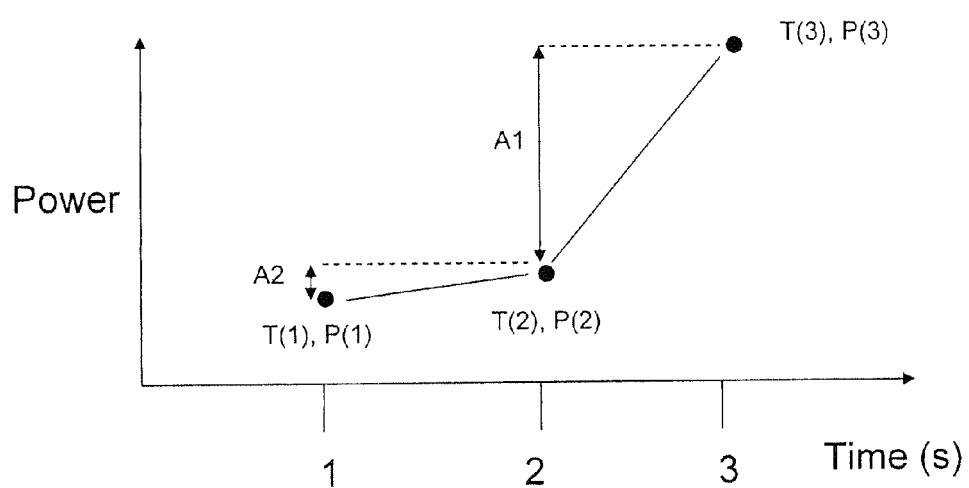
FIG. 6 illustrates the identification of "corners" in electricity consumption data in an event identification process.

The operation of the corner detection algorithm is illustrated schematically in FIG. 6. The compression algorithm identifies "corners" in power demand by identifying differences in the gradient representing rate of change in power from one time point to the next. A point at which there is change in gradient between two time intervals (identified as $T(2)$, $P(2)$) is marked as a "corner" if that change is greater than a predetermined threshold. This is done by measuring the power difference between points $T(3)$, $P(3)$ and $T(2)$, $P(2)$ and between $T(2),P(2)$ and $1(1),P(1)$ to give values A1 and A2 respectively. If the difference B between A1 and A2 exceeds a predetermined value Tol1 then a corner is marked.

Figure 8:
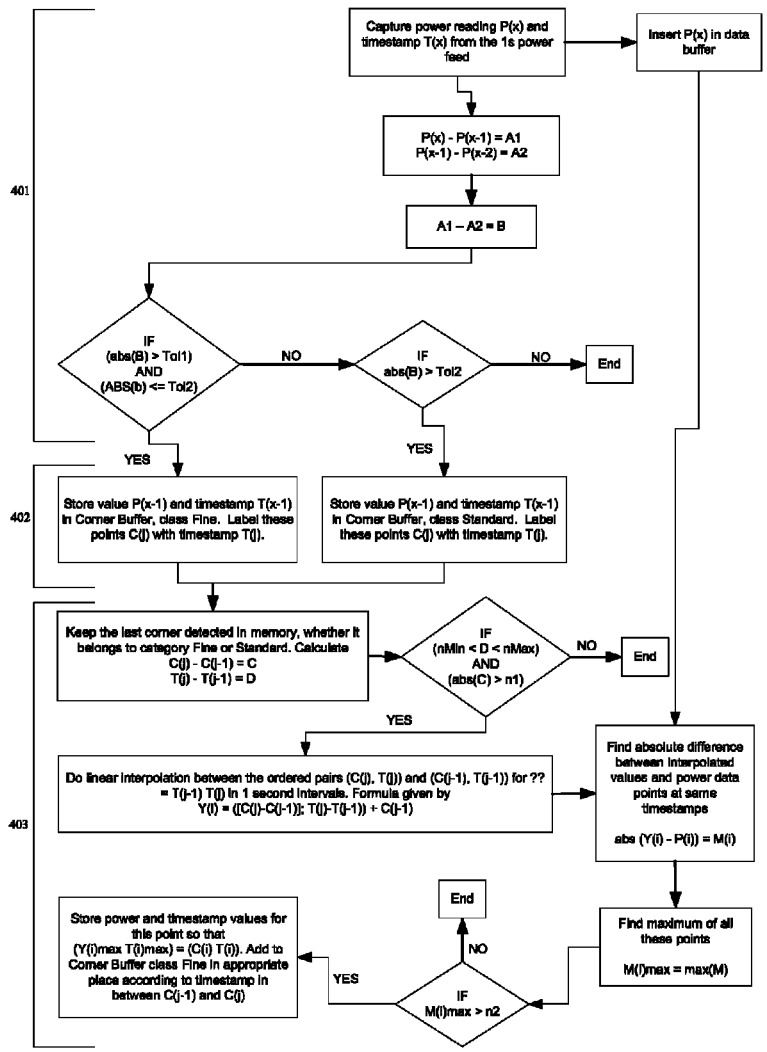
FIG. 8 is a flowchart illustrating the corner detection algorithm in an event identification process.

The operation of the algorithm is illustrated in more detail in FIG. 8 in which:

$T(x)$, $T(i)$ and $T(j)$ represent 32 Bit timestamps $C(x)$, $C(j)$ and $Y(i)$ represent 16 Bit power readings at a corner Tol1, Tol2 represent integer numerical values (0-100)

A1, A2, B represent 16 Bit power reading differences n1, nMax, nMin, n2 represent 16 Bit numerical values $M(i)$, $M(i)$max represent 16 Bit numerical values Section 401 of FIG. 8 illustrates identification of corners as described above with reference to FIG. 6.

Section 402 of FIG. 8 illustrates the classification of corners into "Standard" and "Fine" classes depending, respectively, on whether B is greater than predetermined values Tol1 and Tol2 or greater than Tol1 only.

The skilled person will understand how to select the value of the threshold for marking a point as a corner, and the specific value will vary from case to case. In order to avoid incorrect identification of background noise in identification of a corner, only those points having a signal strength greater than a minimum multiple of background noise strength may be used in corner identification.

By measuring a plurality of these corners in the electricity consumption data, an electricity consumption profile is generated, representing a series of events associated with changes in power demand from which appliances may be identified using known "signature" profiles of those appliances.

Correction

The electricity consumption profile generated as described above with respect to FIG. 6 and sections 401 and 402 of FIG. 8 contains the majority of corners, however a correction may be applied to identify one or more corners that may have been missed.

Figure 7:
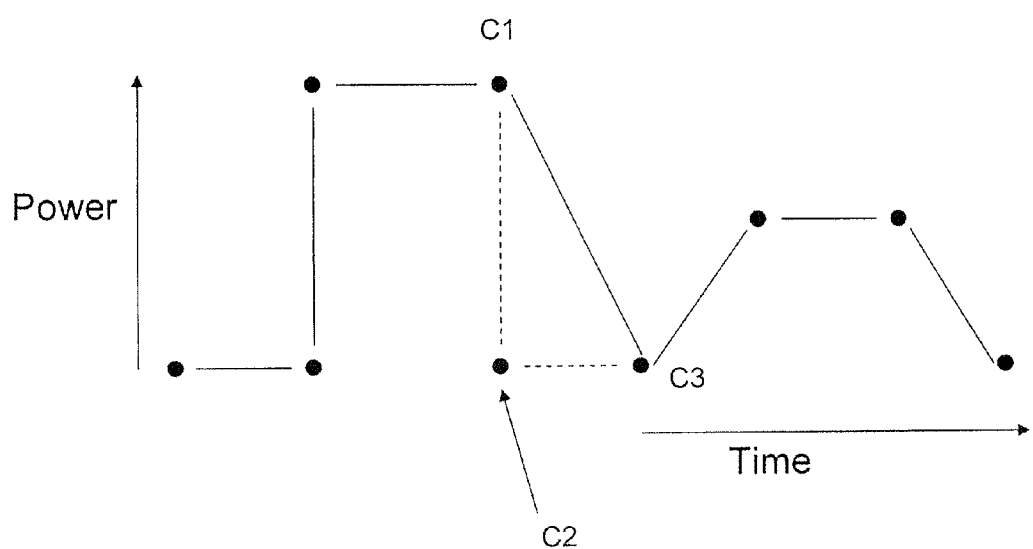
FIG. 7 illustrates schematically the identification of missing corners in an event identification process.

This is illustrated in FIG. 7 which shows a corner $C(2)$ between corners $C(1)$ and $C(3)$ that has been missed by the corner detection algorithm.

A missing corner may be identified if both the power difference (power at C1−power at C2) and the time difference (time at C1−time at C2) fall outside defined values as illustrated in section 403 of FIG. 8.

In this event, a linear interpolation may be conducted to identify any missing corners, as illustrated in Section 403 of FIG. 8. Referring to FIG. 3, missing corner C3 should be inserted at the point giving the most acute angle between lines C1-C2 and C2-C3.

Matching

The electricity consumption profile may be represented in the form of a matrix representing the various events that occurred during the period that electricity consumption was measured. For example, if a refrigerator was switched on during the period of electricity consumption measurement then the signature profile associated with that event may be as follows:

$$\text{Time} \rightarrow \begin{matrix} & \text{Event} \\ & \text{Start} \quad \text{Finish} \\ & (1 \quad 0 \quad 4 \quad 7) \end{matrix}$$

The electricity consumption profile may be analysed to determine if it contains a signature event series stored in a database indicative of a refrigerator switching on. The event series of one or more candidate appliances stored in a database may be compared to the measured profile in order to identify whether the measured profile contains an event series matching that of a refrigerator switching on.

The matrix below illustrates the output from matching of a number of candidate events to the above event matrix. In this case, the first row shows a good match between the measured profile and the event to which it was compared. The further rows show poorer matches, indicating that the measured event probably corresponds to the candidate event of the first row.

$$\text{Time} \rightarrow \begin{pmatrix} 1 & 1 & 1 & 1 \\ 1 & 0 & 1 & 1 \\ 0 & 1 & 0 & 1 \\ 0 & 0 & 0 & 1 \end{pmatrix}$$

In this way, the probability of a given appliance being present in the household can be determined. If this probability exceeds a threshold value then that appliance is assumed to be present in the household. If on the other hand the probability fails below a threshold then that appliance is assumed not to be in the household. For instance, an event series represented by one row of the matrix may form a good match with the event series of an appliance in the database, and so the data in that row can be attributed to an identified appliance.

Parameters associated with an event that may be used to determine a match include the following:

Minimum change in power

Maximum change in power

Peak power minimum

Peak power maximum

Minimum power change time after time 0

Maximum power change time after time 0

Minimum time to next event

Maximum time to next event

Power threshold (the minimum power change between measurement points). These parameters may be determined by measuring event series of known appliances. Each of these parameters may be determined for each specific make and model of an appliance and/or may be a generic parameter to be used for any member of a genus of appliances (for example, the genus of washing machines) wherein the generic parameter is determined by measuring a plurality of devices within a genus and determining a parameter value that is applicable to most or all members of the genus.

Figure 9:
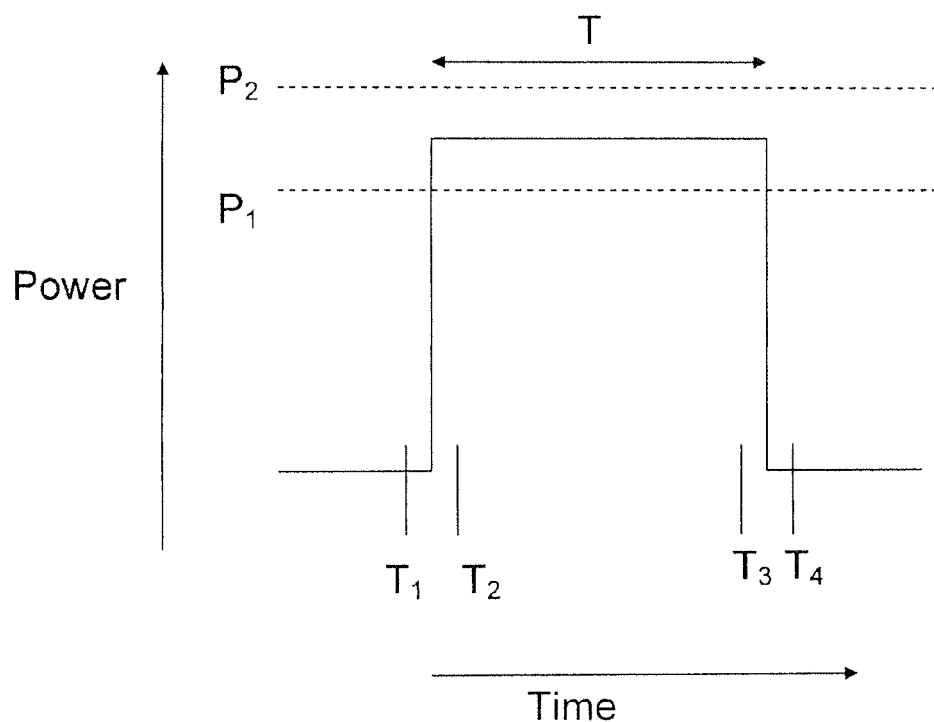
FIG. 9 illustrates a matching step in an event identification process.

This is illustrated schematically in FIG. 9, which illustrates a matching step wherein a match may be based on one or more of an event occurring at a first time point between T1 and T2; the event having an associated power falling between P1 and P2; and a time T until the next event occurring at a time point between T3 and T4.

Weighting may be applied to the event matrix in order to improve the accuracy of matching. For example, one entry within the event matrix may be associated with high power consumption that may be given higher weighting than other entries that may be lower power, and that may be easier to confuse with background electricity consumption.

For any given event, the event series contained within the database comprises a plurality of entries showing at least one power change indicative of an event. Typically, the event comprises a plurality of changes in power value, the magnitude and duration of which can be used to generate a signature event series for that event. However, it is possible that a single change in power value could be stored as an event series within the database, in particular if the magnitude of that change is large enough to provide a distinctive event series.

Different techniques can be used in identification of different appliance genera. Suitable techniques for any given genus will be apparent to the skilled person following measurement and analysis of event series for known appliances within each genus.

For example, a kettle profile can be characterised by an on event, followed by a similar off event after a defined amount of time has elapsed (this amount of time is defined by parameters derived from typical kettle usage). Since kettles may be of different sizes, abroad search in on event magnitudes and duration is firstly carried out in the electricity consumption data for the whole household, yielding matrices with all appliances satisfying those parameters. These results, since they tend to be different instances of appliance usage, tend to form clusters when one plots the on event power magnitude against the duration in time between their respective on and off events. Then a finite mixtures model based clustering method may be used to automatically select the most likely candidate kettle cluster. Other attributes can be calculated from this information, such as an estimate of the amount of water boiled in each kettle use.

On the other hand, in the case of a washing machine, a plurality of discrete events can be identified in relation to operation of a washing machine, such as heating and spin cycle events. Individually, these are simple on/off events, which can be detected individually. Independent analysis of these individual components can then be combined and further analysed to identify a washing machine. Using this information, one can then use a similar method of clustering to determine which is the most likely heating element which corresponds to the washing machine, in order to calculate the energy used, and temperature of the wash cycle, for example.

Thus, in one embodiment an appliance may be detected by identifying an event associated with only part of the operation of that appliance. In particular, by measurement of event series associated with known devices, certain events may be identified as being more prominent than other events (for example due to a power change associated with that event that is particularly characteristic of the appliance genus in question) and may be used as the primary event in the process of appliance detection. Other events determined to be associated with the detected appliance may be used to verify the accuracy of the match and/or to determine parameters such as the amount of energy used by the appliance.

Thus, using information derived from measurement and analysis of electricity consumption profiles of known appliances, the skilled person may identify mathematical techniques suitable for identification of any given appliance or any appliance genus such as the finite mixtures model based clustering technique described above, or other techniques such as hidden Markov models.

In this way, use of known appliance event series for common household appliances allows estimation of most or all of the constituents of measured electricity consumption data for the entire household, and allows for disaggregation of signals associated with operation of more than one appliance.

The appliance may be any appliance to which power is supplied via mains electricity including but not limited to kitchen appliances such as fridges, freezers, microwave ovens, electrical cookers, washing machines, tumble dryers and dishwashers; leisure appliances such as televisions, hi-fis, set-top boxes, video or dvd players or recorders; game consoles; and other appliances such as electric boilers, central heating water pumps, pool pumps, air conditioning units, personal computers, vacuum cleaners, irons and lawn mowers.

Following an initial match of a measured event series to an event series stored in the database associated with a specific appliance, the confidence in accuracy of identification of that appliance may be increased by looking for one or more further event series corresponding to other events associated with operation of that appliance. Furthermore, certain appliances may have event series that occur cyclically, for example a refrigerator. If a match is identified for such an appliance then the match may be verified by checking for this cyclic pattern.

A detected event is not necessarily associated with operation of an appliance. For instance, a power cut or other abnormality in the power supply may possess an identifiable event series.

Databases

As set out above, the event series of one or more candidate appliances stored in a database may be compared to the measured profile in order to identify whether the measured profile contains a profile matching that of a stored event series.

One or more databases may be checked for the purpose of event matching, including but not limited to:

i) A specific appliance database comprising event series associated with specific appliances, such as event series for a plurality of different makes and models of appliances. A database of this type has the advantage of being able to determine very specifically the make and model of devices present in a household.

ii) A generic appliance database comprising event series that are common to genera of devices. For example, the genus of washing machines will all have similar event series such as event series associated with heating or spin cycles, and those similar event series may be used to create a single, generic event series for the event in question. By measuring event series for a plurality of different makes and models of devices it is possible to identify appliance genera and at least one generic event series common to each member of an appliance genus. Use of a generic database of this type has the advantage of being smaller than a database containing event series for a plurality of makes and models of appliances within each genus, and also allows for faster matching.

Initially, a generic event series may be generated using only two event series associated with two different appliances of a common genus, such as the spin cycle of two different models of washing machine. In order to increase matching accuracy for a given event or appliance, each generic event series may be changed over time as event series for known appliances within the same appliance genus are measured.

iii) A household database specific to the household for which utility consumption data is analysed. Following the initial identification of events occurring within a household and the associated appliances, a database specific to that household may be created, and the contents of this database may be used to quickly identify future events based on previously measured occurrences of those events or previous identification of the associated appliance. The speed and accuracy of event matching using a household database may increase as utility consumption data is measured over time. Use of the household database in this way allows for real-time identification of events and appliances, which may be communicated to a system user either local to or remote from the household.

Although the invention has been described above with respect to electricity consumption, it will be appreciated that analogous analysis, outputs and controls may also be applied to consumption of water and gas.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A utility data processing system for processing data relating to consumption of a utility, the system comprising:
   a non-transitory machine readable fact memory for storage of facts relating to utility consumption received from fact sources;
   at least one fact source module for deriving facts from utility consumption data and adding the derived facts to the non-transitory machine readable fact memory, wherein one of the at least one fact source modules comprises an appliance identification module configured to identify one or more appliances using data based on utility consumption by the one or more appliances and to add the identity of the one or more appliances as one or more facts in the non-transitory machine readable fact memory;
   an inference module for inferring new facts relating to utility consumption from one or more facts stored in the non-transitory machine readable fact memory, wherein the inference module is configured to instruct the appliance identification module to search for one or more further unidentified appliances, wherein the search for each of the one or more further unidentified appliances is identified based on the one or more appliances stored as one or more facts that are likely to be present in view of the presence of an identified appliance by analyzing the utility consumption data, and wherein the search comprises matching signature profiles of candidate appliances stored in a database with measured profiles of events of electricity consumption, wherein a signature profile is represented by a series of events associated with the rate of change in power demand from one time point to the next; and
   an interface module.

2. The system of claim 1, wherein the appliance identification module comprises:
   a profile generator for generating a utility consumption profile from utility consumption data, the utility consumption data comprising a plurality of utility consumption values measured at a corresponding plurality of measurement points; and
   an event identifier for identifying an event within the utility consumption profile that matches the profile of a known event associated with operation of a known device, said known event stored in a database of utility consumption profiles.

3. The system of claim 2, wherein the appliance identification module is further configured to add the time of use or duration of use the one or more appliances present within the household as one or more facts in the non-transitory machine readable fact memory.

4. The system of claim 1, wherein the at least one fact source module comprises a statistics module configured to generate statistical facts on energy consumption from the utility consumption data.

5. The system of claim 4, wherein the statistical facts is at least one of an energy use per period of time, variations in energy usage per period of time, and a baseload energy.

6. The system of claim 5, wherein the period of time is one or more of 1 hour, 1 day, 1 week, 1 month and 1 year.

7. The system of claim 1, further comprising a data memory for storage of utility consumption data received from at least one utility meter.

8. The system of claim 1, wherein the interface module is a presentation interface configured to present facts on a display screen.

9. The system of claim 8, wherein the system is configured to receive data from the presentation interface.

10. The system of claim 8, wherein the non-transitory machine readable fact memory is configured to receive facts declared by a user of the system via the interface.

11. The system of claim 10, wherein the system is configured to prompt a declaration of a fact by a user.

12. The system of claim 1, wherein the interface module is a control interface.

13. The system of claim 12, wherein the control interface is configured to control utility consumption within a household managed by the utility data processing system based on control parameters determined by one or more facts.

14. The system of claim 4, wherein the statistics module is further configured to generate average utility consumption by a group of households.

15. A computer-implemented method of processing utility consumption data, the method comprising:
   receiving utility consumption data;
   deriving at least one fact from utility consumption data, wherein the deriving comprises identifying one or more appliances using data based on utility consumption by the one or more appliances;
   storing the at least one fact in a non-transitory machine readable fact memory;
   inferring at least one new fact from the at least one fact stored in the non-transitory machine readable fact memory; and
   based on the inference, instructing a search for one or more further identified appliances, wherein the search for each of the one or more further unidentified appliances is identified based on the one or more appliances stored as one or more facts that are likely to also be present in view of the presence of the identified appliance by analyzing the utility consumption data, and wherein the search comprises matching signature profiles of candidate appliances stored in a database with measured profiles of events of electricity consumption, wherein a signature profile is represented by a series of events associated with the rate of change in power demand from one time point to the next.

16. An article of manufacture, comprising:

a non-transitory machine-readable storage medium; and executable program instructions embodied in the non-transitory machine readable storage medium that when executed by a programmable system causes the system to perform the function of processing utility consumption data comprising:

receiving utility consumption data;

deriving at least one fact from the utility consumption data, wherein the deriving comprises identifying one or more appliances using data based on utility consumption by the one or more appliances;

storing the at least one fact in a non-transitory machine-readable fact memory;

inferring at least one new fact from the at least one fact stored in the non-transitory machine readable fact memory; and based on the inference, initiating a search for one or more further identified appliances, wherein the search for each of the one or more further unidentified appliances is identified based on the one or more appliances stored as one or more facts that are likely to be present in view of the presence of the identified appliance by analyzing the utility consumption data, and wherein the search comprises matching signature profiles of candidate appliances stored in a database with measured profiles of events of electricity consumption, wherein a signature profile is represented by a series of events associated with the rate of change in power demand from one time point to the next.

\* \* \* \* \*